United States Patent Office 3,340,288
Patented Sept. 5, 1967

3,340,288
VINYLHEPTAPHENYLCYCLOTETRASILOXANE
Christian R. Sporck, Burnt Hills, N.Y., assignor to General Electric Company, a corporation of New York
No Drawing. Filed Dec. 18, 1961, Ser. No. 160,268
1 Claim. (Cl. 260—448.2)

This invention relates to cyclic organopolysiloxanes and to polymers prepared therefrom.

A number of cyclic organosilicon materials and polymers prepared therefrom are known in the art, including materials which contain a high proportion of silicon-bonded phenyl groups. However, one of the known disadvantages of materials containing a high proportion of phenyl groups is the fact that these materials are usually hard, intractable materials which are difficult to shape. In addition it is sometimes found that linear polydiorganosiloxanes containing a high percentage of silicon-bonded phenyl groups are difficult to cure by ordinary free-radical catalysts. The presence of a large proportion of silicon-bonded phenyl groups in organosilicon polymers is desirable because of the properties imparted to the organopolysiloxanes by the phenyl groups. Thus, phenyl groups attached to silicon improve the resistance of organosilicon materials to irradiation, such as pile irradiation or high energy electron irradiation. The presence of these silicon-bonded phenyl groups in elastomeric organopolysiloxanes renders materials resistant to oxidative degradation at a temperature far above the temperature at which methylpolysiloxane elastomers are stable.

It is an object of the present invention to provide a new class of cyclic organosilicon compounds and to provide high molecular weight linear organosilicon compounds from these cyclic organosilicon compounds, the high molecular weight linear organosilicon compounds having a high percentage of silicon-bonded phenyl groups but being readily curable to the solid, elastic state by conventional silicone rubber curing catalysts.

The cyclic organosilicon compounds of the present invention have the formula:

(1)
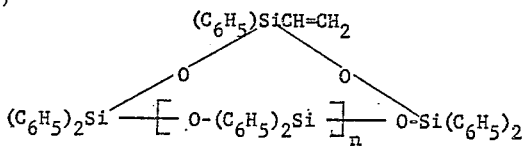

where $n$ is a whole number equal to from 0 to 1, inclusive. The cyclopolysiloxane of Formula 1 can be polymerized to provide linear organopolysiloxanes consisting essentially of the recurring unit:

(2) —$(C_6H_5)Si[O—(C_6H_5)Si]_nO—(C_6H_5)_2Si—O—(C_6H_5)(CH_2=CH)Si—O—$ where $n$ is as previously defined. In addition, the cyclopolysiloxanes of Formula 1 can be copolymerized with other cyclopolysiloxanes to form various copolymers.

As is apparent from Formula 1, two cyclopolysiloxanes are encompassed within the present invention. These materials are vinylpentaphenylcyclotrisiloxane and vinylheptaphenylcyclotetrasiloxane.

The cyclopolysiloxanes within the scope of Formula 1 are prepared by effecting reaction between an hydroxy chain-stopped polydiphenylsiloxane having the formula:

(3)
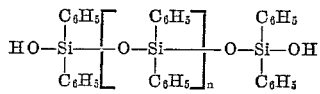

where $n$ is as previously defined, and a phenylvinyldihalogenosilane having the formula:

(4) $(C_6H_5)(CH_2=CH)SiX_2$ where X is halogen, e.g., chlorine, bromine, etc., and preferably chlorine. It is apparent that Formula 3 encompasses two compounds, namely, tetraphenyldisiloxanediol-1,3 and hexaphenyltrisiloxanediol-1,5.

The reaction between the hydroxyl chain-stopped material of Formula 3 and the dihalogenosilane of Formula 4 theoretically involves one mole of each reactant and the result of the reaction is the splitting out of two molecules of hydrogen halide. To facilitate the reaction a hydrogen halide acceptor is employed. Suitable hydrogen halide acceptors are any organic tertiary amine such as pyridine, triethylamine, N,N-dimethyl aniline, etc. In theory, two moles of the hydrogen halide acceptor are required per mole of the other reactants. While the theoretical ratio of the reactants and the hydrogen halide acceptor have been described above, the ratio of these various ingredients can vary within fairly wide limits. For example, the hydroxyl chain-stopped polydiphenylsiloxane of Formula 3 can be employed in an amount equal to from about 0.5 to 2 moles per mole of the dihalogenosilane of Formula 4. Preferably, the halogen halide acceptor is employed in excess, with there being employed from 3 to 30 moles of hydrogen halide acceptor per mole of whichever of the other reactants is present in the smaller molar amount.

Preferably, the hydroxyl chain-stopped material of Formula 3 and the dihalogenosilane of Formula 4 are employed in equimolar amounts to reduce the formation of by-products and to simplify the purification of the desired cyclopolysiloxane since no significant amount of unreacted starting materials are left in the reaction mixture.

Because the two reactants and the cyclopolysiloxane of Formula 1 are solid materials, it is preferable to effect the reaction of the present invention in a solvent which is inert to the reactants under the conditions of the reaction and which is a solvent for both the reactants and the reaction product. Suitable solvents include tetrahydrofuran, tetrahydropyran, n-hexane, xylene, diethyl ether and toluene. In general, the solvent is employed in a ratio of from about 1 to 50 parts by weight, based on the total weight of the other components of the reaction mixture. Because the reaction to form the cyclopolysiloxane of Formula 3 proceeds at a satisfactory rate at room temperature, it is preferred to conduct the reaction at such temperature, i.e., a temperature of from 15 to 25° C. However, it should be understood that the use of elevated temperatures, e.g., temperatures of from about 15 to about 120° C., is not precluded. Depending upon the proportions of ingredients and the reaction temperature and the particular solvent employed, the time required for effecting reaction between the silanol chain-stopped diphenylpolysiloxane of Formula 3 and the dihalogenosilane of Formula 4 can vary from about 1 hour to 24 hours or more.

After the reaction is completed, the reaction mixture consists of a solution of the desired cyclopolysiloxane together with any unreacted starting materials and a precipitate of the hydrohalide of the hydrogen halide acceptor. This precipitate is filtered from the reaction mixture and the resulting filtrate is stripped of solvent and starting materials, resulting in a crude product. This product is recrystallized from a suitable solvent such as benzene, hexane, n-butanol, cyclohexane, or n-propanol or a mixture of n-heptane and n-propanol, to produce the purified cyclopolysiloxanes within the scope of Formula 1.

Polymeric materials consisting essentially of the recurring unit of Formula 2 can be formed by the polymerization of the cyclopolysiloxanes of Formula 1 by several methods. For example, the cyclopolysiloxanes within the scope of Formula 1 can be polymerized by heat alone by maintaining the cyclopolysiloxane at a temperature of about 250 to 350° C., preferably in an inert atmosphere such as a nitrogen or a noble gas atmosphere, for about 15 minutes to one hour, during which time the siloxane bonds open up and permit a conventional rearrangement and condensation to form a high molecular weight polymeric material which is a tough, transparent gum, soluble in benzene or toluene. This gum can contain from about 20 to 10,000 to more, and preferably from about 200 to 10,000 or more of the units of Formula 2, depending upon the reaction temperature and time. In general, these gums have an intrinsic viscosity in the order of from about 0.25 to 4 and have a molecular weight of the order of 10,000 to 5,000,000 or more.

Another method of forming the polymers of the present invention is by the catalytic rearrangement and condensation of the cyclopolysiloxanes of Formula 1. This rearrangement and condensation is effected in the presence of a typical alkaline organopolysiloxane rearrangement and condensation catalyst such as potassium hydroxide. The rearrangement and condensation catalyst is conveniently added to the cyclopolysiloxane as a solution in octamethylcyclotetrasiloxane, for example, as an organopolysiloxane solution containing from about 0.1 to 1% potassium hydroxide. In general, the amount of potassium hydroxide added is sufficient to provide about 10 to 100 parts by weight potassium hydroxide per million parts by weight of the cyclopolysiloxane. The catalytic polymerization is effected by heating the mixture of the potassium hydroxide and the cyclopolysiloxane at a temperature above the melting point of the cyclopolysiloxane so as to insure thorough mixing of the catalyst with the cyclopolysiloxane. In general, this polymerization is effected at a temperature of from about 135 to 170° C. with polymerization being effected in a time of from a few seconds up to one hour or more. The gums resulting from the base catalyzed copolymerization are identical to those produced by the thermal polymerization previously mentioned.

In addition to forming polymers of the cyclopolysiloxanes of Formula 1 alone, copolymers can be prepared by reacting the cyclopolysiloxane of Formula 1 with other cyclic polydiorganosiloxanes, preferably employing the base catalyzed reaction described above. Suitable cyclopolysiloxanes for copolymerization with the cyclopolysiloxanes of Formula 1 include, for example, hexaphenylcyclotrisiloxane, hexamethylcyclotrisiloxane, octaphenylcyclotetrasiloxane, or octamethylcyclotetrasiloxane; 1,1 - dimethyl - 3,3,5,5 - tetraphenylcyclotrisiloxane which is described and claimed in my copending application Ser. No. 160,264, now abandoned, which is filed concurrently herewith and assigned to the same assignee as the present invention; 1,1-dimethyl-3,3,5,5,7,7-hexaphenylcyclotetrasiloxane which is described and claimed in the copending application of Howard A. Vaughn, Jr., Ser. No. 160,267, now abandoned, filed concurrently herewith and assigned to the same assignee as the present invention; triphenylsiloxy pentaphenylcyclotrisiloxane or triphenylsiloxy heptaphenylcyclotetrasiloxane which are described and claimed in my copending application Ser. No. 160,263, now Patent No. 3,310,526, filed concurrently herewith and assigned to the same assignee as the present invention; 1-methyl-1-vinyl-3,3,5,5-tetraphenylcyclotrisiloxane or 1-methyl-1-vinyl-3,3,5,5,7,7-hexaphenylcyclotetrasiloxane which are described and claimed in my copending application Ser. No. 160,269; 1,1 - bis - (p - chlorophenyl) - 3,3,5,5 - tetraphenylcyclotrisiloxane or p-chlorophenylheptaphenylcyclotetrasiloxane which are described and claimed in my copending application Ser. No. 160,265; methylpentaphenylcyclotrisiloxane or methylheptaphenylcyclotetrasiloxane which are described and claimed in my copending application Ser. No. 160,270; 1-methyl-1-(beta-cyanoethyl)-3,3,5,5-tetraphenylcyclotrisiloxane or gamma-cyanopropylheptaphenylcyclotetrasiloxane which are described and claimed in my copending application Ser. No. 160,271; compounds such as 1,1-bis-(trifluoromethylphenyl)-3,3,5,5-tetraphenylcyclotrisiloxane which are described and claimed in my copending application Ser. No. 160,272; and cyclic materials containing both siloxane linkages and silphenylene linkages such as are described and claimed in my copending application Ser. No. 160,262.

The copolymerization of the cyclopolysiloxanes of Formula 1 with the other cyclopolysiloxanes described above results in high molecular weight polysiloxane gums which are tough and soluble in solvents such as benzene and toluene. Where copolymeric organopolysiloxanes are prepared by copolymerizing a cyclopolysiloxane within the scope of Formula 1 with another cyclopolysiloxane, the procedure employed is identical to that employed in preparing the polymers within the scope of Formula 2. The ratio of the various cyclopolysiloxanes used in the preparation of the copolymers can vary without limit, depending upon the characteristics desired in the final copolymeric material. Thus, copolymers can be prepared from cyclopolysiloxane mixtures containing from 1.0 to 99 percent by weight of the cyclopolysiloxanes of Formula 1.

All of the polymers consisting of the repeating unit of Formula 2 as well as all of the copolymers which contain the repeating unit of Formula 2 together with other polydiorganosiloxane units and which contain at least one vinyl group per one hundred silicon atoms or which contain at least one adjacent pair of methyl group-containing silicon atoms per one hundred silicon atoms can be cross-linked with conventional free-radical catalysts in the presence or the absence of various filler materials to produce cured silicone rubber. Among the many catalysts which can be employed in the cross-linking of the homopolymers and copolymers of the present invention are the organoperoxide vulcanizing agents such as, for example, benzoyl peroxide, dichlorobenzoyl peroxide, dicumyl peroxide, tertiarybutyl perbenzoate, etc., as well as the well known diazo compound free-radical catalyst. In addition, the homopolymers and copolymers of the present invention can be cross-linked by bombardment with high energy electrons by the method described and claimed in Patent 2,763,609, Lawton et al., employing an irradiation dose of from about $100 \times 10^6$ to $1000 \times 10^6$ roentgens using electrons having energies of from about 50,000 to 20,000,000 electron volts.

Among the many fillers which can be employed with the polymers and copolymers of the present invention are the various silica fillers such as silica aerogel, fumed silica, and precipitated silica as well as other types of fillers such as titanium dioxide, calcium silicate, ferric oxide, chromic oxide, cadmium sulfide, asbestos, glass fibers, calcium carbonate, carbon black, lithopone, talc., etc. Preferably, the filler employed in preparing the silicone rubber is a finely divided silica filler. In preparing silicone rubber from the polymers and copolymers of the present invention, the various fillers can be employed in the ratio of from about 20 to 300 parts by weight per 100 parts of the polymer or copolymer and the organo peroxide vulcanizing agent is generally employed in the ratio of from about 1 to 10 percent by weight, base on the weight of the polymer or copolymer. Cross-linking of these compositions is effected by heating the compositions at an elevated temperature, e.g., a temperature of from about 120 to 150° C. for a time sufficient to effect cure. In general, a satisfactory method of curing the materials comprises heating in a mold at a temperature of about 125° C. for 10 minutes followed by a post-cure at 150° C. for one hour. The presence of the silicon-bonded vinyl group in the polymers and copolymers facilitates a cure of these materials so that cure is effected much more readily than in the case of polymeric materials which do not contain silicon-bonded vinyl groups and in which most of the organic substituents are aryl radicals such as phenyl groups.

The silicone rubbers described above are useful in all of those applications where conventional silicone rubbers are useful and are particularly useful in applications where resistance to irradiation is required, where flexibility over an extremely wide temperature range is required and where an exceptionally high degree of thermal stability is required. For example, these materials are satisfactory for use as gaskets for automobile transmissions and oven door seals and the like.

The following examples are illustrative of the practice of my invention and are not intended for purposes of limitation. All parts are by weight.

EXAMPLE 1

To a solution of 10.2 parts phenylvinyldichlorosilane and 15 parts of pyridine in 210 parts diethyl ether was added a solution of 20.7 parts of tetraphenyldisiloxane-diol-1,3 in 70 parts diethyl ether. The resulting reaction mixture was stirred for two hours and allowed to stand for sixteen hours, during which time pyridine hydrochloride precipitated. This precipitate was removed and the filtrate was heated at a temperature of 30 to 40° C. to remove the ether and then at a temperature of about 115 to 116° C. to remove excess pyridine. The resulting solids were dissolved in hot butanol and allowed to recrystallize. The recrystallized solids were washed with ethanol and then recrystallized twice more from an equal volume mixture of heptane and propanol, resulting in a white crystalline material having a melting point of 130 to 131.5° C. This material was vinylpentaphenylcyclotrisiloxane having the formula:

(5)
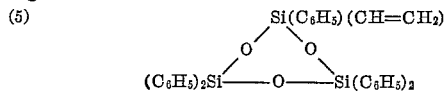

The identity of the product was confirmed by infrared analysis which showed a doublet at 8.9 microns and a peak at 13.9 microns corresponding to the diphenylsiloxy groups, a peak at 9.8 microns corresponding to the cyclotrisiloxane ring, and peaks at 7.1 and 10.3 microns corresponding to vinyl silyl group. Chemical analyses showed the presence of 5.5% vinyl groups, 70.4% C and 5.2% H, as compared with the theoretical values of 5.0% vinyl, 70.7% C, and 5.1% H.

EXAMPLE 2

To a solution of 15 parts of phenylvinyldichlorosilane and 25 parts pyridine in 400 parts diethyl ether are added a solution of 36 parts hexaphenyltrisiloxanediol-1,5 in 150 parts diethyl ether. This mixture is stirred for six hours and the pyridine hydrochloride precipitate which forms is removed by filtration. The filtrate is then heated slowly to a temperature of 140° C. to remove the diethyl ether and unreacted pyridine and phenylvinyldichlorosilane. The solids which appear upon cooling are dissolved in n-butanol at a temperature of about 60° C. and the solution is allowed to cool to room temperature. The crystals which precipitate from the cool butanol solution are washed with ethanol and twice recrystallized from a 50/50 mixture of n-heptane and n-propanol, resulting in purified vinylheptaphenylcyclotetrasiloxane having the formula:

(6)
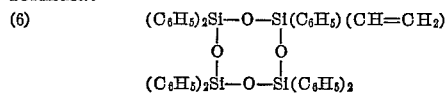

EXAMPLE 3

About 7.5 parts of the vinylpentaphenylcyclotrisiloxane prepared in Example 1 was heated to a temperature of about 140° C. where it became liquid, and 0.1 part of a 0.4 percent solution of potassium hydroxide in octamethylcyclotetrasiloxane was added to the liquid. Within five seconds, the liquid material polymerized to a tough, transparent gum which was maintained at the polymerization temperature for 15 additional minutes. At the end of this time, the resulting product was a linear polydiorganosiloxane consisting essentially of the following recurring structural units:

(7) 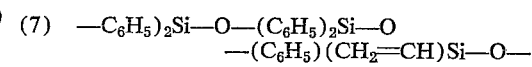

This material had an intrinsic viscosity of about .76 deciliter per gram and a molecular weight of about 180,000, indicating that the average polymer molecule contained about 320 of the units of Formula 7. Infrared analysis of the linear polymer confirmed the fact that the cyclotrisiloxane structure was no longer present. A silicone rubber is prepared from this polymer by mixing 1.0 part of the polymer with 0.4 part silica aerogel and 0.04 part benzoyl peroxide and heating the polymer in a closed mold for 10 minutes at 125° C. with a post-cure for one hour at 150° C. The resulting cured silicone rubber is a strong elastic material having a high degree of thermal stability and resistance to the effects of ionizing radiation.

EXAMPLE 4

Following the procedure of Example 3, a homopolymer consisting essentially of the following recurring structural units:

(8) 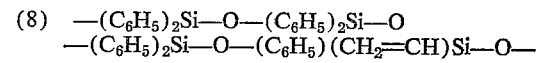

is prepared from the vinylheptaphenylcyclotetrasiloxane of Example 2. This homopolymer is converted to a silicone rubber by the procedure of Example 3.

EXAMPLE 5

A copolymer is prepared by mixing 100 parts of the vinylpentaphenylcyclotrisiloxane of Example 1 with 50 parts of hexaphenylcyclotrisiloxane, catalyzing the mixture with 25 parts per million parts of the cyclotrisiloxanes of potassium hydroxide added as a 1.0 percent solution of potassium hydroxide in octamethylcyclotetrasiloxane and heating the catalyzed mixture at a temperature of 150° C. for 15 minutes. This copolymer is then converted to a cured silicone rubber by the procedure of Example 3.

What I claim as new and desire to secure by Letters Patent of the United States is:

Vinylheptaphenylcyclotetrasiloxane.

References Cited

UNITED STATES PATENTS

| | | | |
|---|---|---|---|
| 2,645,628 | 7/1953 | Hurd | 260—448.2 |
| 2,684,379 | 7/1954 | Guillissen et al. | 260—448.2 |
| 2,868,766 | 1/1959 | Johansson | 260—448.2 |
| 3,037,962 | 6/1962 | Hartung et al. | 260—448.2 |
| 3,105,061 | 9/1963 | Bruner | 260—448.2 |
| 3,122,579 | 2/1964 | Leitheiser | 260—448.2 |

FOREIGN PATENTS 1,161,802  3/1958  France.

TOBIAS E. LEVOW, *Primary Examiner.*

SAMUEL H. BLECH, *Examiner.*

P. D. FREEDMAN, J. G. LEVITT, P. T. SHAVER,
*Assistant Examiners.*